March 18, 1924.

L. OPPENHEIMER

PNEUMATIC TIRE FLAP

Filed Aug. 16, 1922

1,487,261

INVENTOR.
LUTHER OPPENHEIMER
BY A.B. Bowman
ATTORNEY

Patented Mar. 18, 1924.

1,487,261

UNITED STATES PATENT OFFICE.

LUTHER OPPENHEIMER, OF EL CAJON, CALIFORNIA.

PNEUMATIC-TIRE FLAP.

Application filed August 16, 1922. Serial No. 582,259.

*To all whom it may concern:*

Be it known that I, LUTHER OPPENHEIMER, a citizen of the United States, residing at El Cajon, in the county of San Diego and State of California, have invented certain new and useful Improvements in Pneumatic-Tire Flaps, of which the following is a specification.

My invention relates to pneumatic tire flaps for vehicle tires, more particularly to improvements in the conventional or commercially known flaps for pneumatic tires and the objects of my invention are: first, to provide a flap of this class which will remain in position between the tube and the casing and rim of the wheel at all times and which is positioned and prevented from shifting by the inner edges of the casing; second, to provide a flap of this class which will not stretch or get cramped up at its edges as is the case with the conventional liners or flaps; third, to provide a flap of this class in which the usual pinching of tubes by the conventional flap will be reduced to a minimum; fourth, to provide a flap of this class which will tend to keep the tube in its natural shape, substantially that of a torus; fifth, to provide a novelly constructed tire flap and sixth, to provide a flap of this class which is very simple and economical of construction, durable, efficient, practical, which may be easily installed and which will not readily deteriorate or get out of order.

Figure 1:
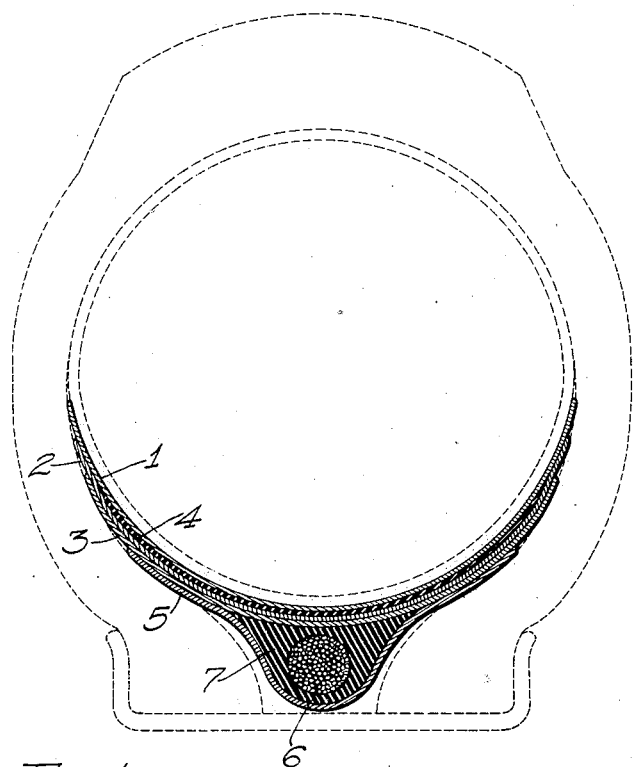
Figure 2:
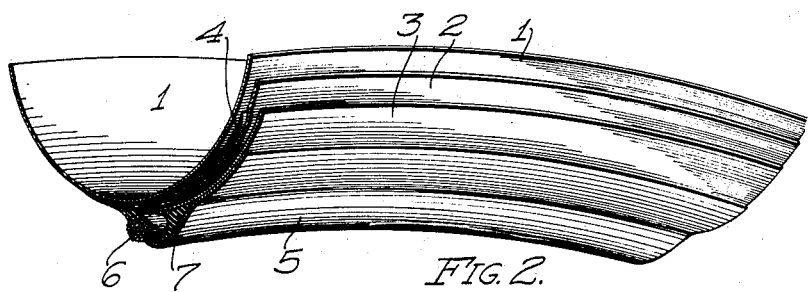

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a cross-sectional view of my flap in position between the conventional pneumatic tube and non-clincher casing and wheel rim showing the tube, casing and rim by dotted lines and Fig. 2 is a reduced fragmentary perspective view of my tire flap alone.

Like characters of reference refer to similar parts and portions throughout the several views of the drawings.

The inner member 1, intermediate member 2, outer member 3, rubber filler member 4, bead support member 5, bead filler 6, and the bead filler positioning member 7 constitute the principal parts and portions of my tire flap structure.

My tire flap when extended as when interposed between the tube and the casing is circular in shape and may be either endless, made in a straight piece cut to length like the conventional flaps and butted together at the ends or may be made in a straight piece and tapered at the ends so that said ends may overlap each other. Said tire flap also assumes a circular cross-section when interposed between the tube and the casing and is built up of a series of rubberized fabric members, the whole construction of which tapers gradually from the bead to the outer portion or edges. The fabric members consist preferably of an inner member 1 which substantially surrounds the inner portion of the pneumatic tube, an intermediate member 2 slightly narrower than the inner member 1 and spaced from the edges of said member and an outer member 3 narrower than and spaced from the edges of the member 2. A rubber filler member 4 is interposed between the members 1 and 2 to reinforce said member and increase the thickness at the middle portion of the flap. I have provided a bead at the middle and normally inner portion of the flap which consists of a bead filler 6 preferably made from hemp rope, surrounded and positioned by the bead filler positioning member 7. The members 6 and 7 are held in position and secured to the member 3 by the supporting member 5 which is also preferably made from rubberized fabric and cemented or molded to the outer member 3. The bead thus formed is slightly narrower than and extends into the space between the edges of the casing so as to permit sufficient flexibility and ease in longitudinal alignment of the flap between the tube and the casing of the tire. It will be noted that the bead filler positioning member 7 is preferably made of a pliable substance which will yield slightly when subjected to the pressure of the inflated tube or to heat generated by the tire when running on the highway and temporarily form the bead to conform with the space formed by the open portion of the casing.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

It is obvious that I have provided a tire flap which will remain in position between the tube and the casing and rim of the wheel at all times; which will not stretch or get cramped up at its edges as is the case with the conventional flap; in which the usual pinching of tubes by the conventional flap will be reduced to a minimum; which will tend to keep the tube in its natural shape; that I have provided a novelly constructed flap of this class and that I have provided a flap which is very simple and economical of construction, durable, efficient, practical, easy to install and which will not readily deteriorate or get out of order.

Having thus described my invention what I claim as new and desire to secure by Letters Patent is:

1. A tire flap, including a tire flap portion having a circular cross-section adapted to be interposed between a pneumatic tube and casing and a bead portion secured to the middle portion of the outer side thereof, forming an integral part of the flap portion thereof.

2. A tire flap, including a tire flap portion substantially tapered from the middle portion outwardly and having a circular cross-section adapted to be interposed between a pneumatic tube and casing and a bead portion secured to the middle portion of the outer side thereof and formed with and forming part of the flap portion thereof.

3. In a tire flap, the combination with a conventional pneumatic tube, casing and wheel rim, of a circular flap portion having a circular cross-section interposed between said pneumatic tube and casing and a bead portion secured to and extending around the middle portion of the inner side of said circular flap portion.

4. A tire flap, including a tire flap portion consisting of a series of rubberized fabric members moulded together, the normally outer members being respectively narrower in width than the adjacent inner members and a bead portion extending longitudinally along the middle portion of the normally outer flap member.

5. A tire flap, including a tire flap portion consisting of a series of rubberized fabric members moulded together, the normally outer members being respectively narrower in width than the adjacent inner members and a bead portion consisting of a bead filler, a filler bead positioning member and a rubberized fabric supporting member securing said bead filler and said filler positioning member to said flap portion.

In testimony whereof, I have hereunto set my hand at San Diego, California, this 9th day of August, 1922.

LUTHER OPPENHEIMER.